United States Patent Office 3,446,847
Patented May 27, 1969

3,446,847
POLY(DIFLUORAMINO)ALKANES
Jeremiah P. Freeman, Huntsville, Ala., assignor to Rohm & Haas Company, Philadelphia, Pa., a corporation of Delaware
No Drawing. Filed Sept. 24, 1963, Ser. No. 311,613
Int. Cl. C07c 87/20, 87/22, 85/08
U.S. Cl. 260—583                                    5 Claims This invention concerns a process for the introduction or difluoramino groups, $NF_2$—, into organic compounds, and the $NF_2$-containing compounds so produced. More particularly, it concerns the use of enol phosphates which are treated with tetrafluorohydrazine, $N_2F_4$, and the resulting product is treated with difluoramine, $HNF_2$, and sulfuric acid.

This process makes possible the production of poly(difluoramino) compounds which are useful as high energy plasticizers for high energy propellants. Inasmuch as they are high energy compounds, they do not detract from the specific impulse of the propellants prepared therewith, as do other commonly used plasticizers, such as dibutyl phthalate, dioctyl sebacate, dibutyl sebacate, tricresyl phosphate and the like.

The following equations are typical of the reaction steps employed:

$$RCOCHX R^2 + P(OR^1)_3 \longrightarrow R-\underset{\underset{R^2}{|}}{C}=CH \quad \overset{OP(OR^1)_2}{\underset{}{}}$$

$$\overset{N_2F_4}{\longrightarrow} \quad R-\underset{\underset{NF_2}{|}}{\overset{\overset{OP(OR^1)_2}{|}}{C}}-\underset{\underset{NF_2}{|}}{\overset{R^2}{C}H} \quad (II) \quad \overset{HNF_2}{\underset{H_2SO_4}{\longrightarrow}} \quad R\underset{\underset{NF_2}{|}}{\overset{NF_2}{C}}-\underset{\underset{NF_2}{|}}{\overset{R^2}{C}H} \quad (III)$$

in which

R=H or lower alkyl, $C_1$–$C_4$
$R_1$=lower alkyl, $C_1$–$C_4$
$R^2$=H or $CH_3$
X=Cl or Br Compounds of the general formula $(XCH_2CO)_2(CH_2)_y$ in which X=Cl or Br and y=1 to 10, can replace $$R\underset{\underset{}{|}}{COCHX}$$

in the reactions shown hereinbefore to yield hexakis(difluoramino) compounds.

The equations above represent the reactions which are employed using an α-haloketone to get a tris(difluoramino)-substituted compound. When a di α-haloketone is employed using the same reactions, a hexakis (difluoramino) hydrocarbon is obtained.

The reaction to produce the unsaturated alkyl phosphate (I) is shown in the literature "Lichtenthaler, Chem. Rev., 61, 607 (1961)." (I) is converted to a bis(difluoramino) adduct (II) by treatment with $N_2F_4$ and this reaction is preferably carried out in an inert solvent such as methylene chloride, ethylene dichloride, carbon tetrachloride, and the like. The reaction is preferably conducted under pressure and this can be in the range from about 1 atm. to about 25 atms. The temperature is in the range 80° C. to 150° C. A particularly preferred range is from 80° C. to 100° C. The molar ratio of the phosphate (I) to the $N_2F_4$ can be varied and can be from 1 to 1 to 1 to 5. A preferred molar ratio is 1 to 3. The reaction of the adduct (II) with $HNF_2$ and $H_2SO_4$ is carried out at a temperature from about 0° C. to 25° C. This reaction is preferably carried out at atmospheric pressure. The molar ratio of the adduct (II) to $HNF_2$ can be varied from about 1 to 1 to 1 to 5. The preferred molar ratio is from 1 to 3.

The following examples are typical of the reaction of a mono-α-chloroketone and a di-α-chloroketone to give a tris(difluoramino) hydrocarbon and a hexakis(difluoramino) hydrocarbon respectively.

EXAMPLE I

Preparation of 1,2,2-tris(difluoramino) propane $$ClCH_2COCH_3 + (CH_3O)_3P \longrightarrow CH_2=\underset{\underset{O}{\downarrow}}{\overset{\overset{CH_3}{|}}{C}}-OP(OCH_3)_2 \overset{N_2F_4}{\longrightarrow}$$

(I)

$$NF_2CH_2\underset{\underset{NF_2}{|}}{\overset{\overset{CH_3 \; O}{|\;\uparrow}}{C}}-OP(OCH_3)_2 \overset{HNF_2}{\underset{H_2SO_4}{\longrightarrow}} NF_2CH_2C(NF_2)_2CH_3$$

(II)                              (III)

Isopropenyl dimethyl phosphate (I) was prepared according to literature methods. It was converted to its $N_2F_4$ adduct II by heating it under a pressure of 2 atms. in $CCl_4$ solution with $N_2F_4$.

At —80° C. 1.35 g. (0.005 mole) of (II) was added to a mixture of 5 ml. of conc. $H_2SO_4$ and 5 ml. of 30% fuming $H_2SO_4$. $HNF_2$ (225 cc., STP) was admitted and the mixture was stirred at room temperature for an hour. Upon distillation, 1,2,2-bis(difluoramino) propane was obtained.

Calc'd: C, 18.3; H, 2.5; N, 21.3; F, 57.9. Found: C, 18.0; H, 2.7; N, 20.8; F, 56.8.

EXAMPLE II

Preparation of 1,2,2,7,7,8-hexakis(difluoramino)octane $$ClCH_2COCH_2CH_2CH_2CH_2COCH_2Cl + 2(CH_3O)_3P \longrightarrow$$

$$CH_2=\underset{\underset{\underset{O}{\downarrow}}{\overset{OP(OCH_3)_2}{|}}}{\overset{\overset{OP(OCH_3)_2}{|}}{C}}(CH_2)_4C=CH_2$$

(IV)  $\downarrow N_2F_4$ $$NF_2CH_2C(NF_2)_2(CH_2)_4C(NF_2)_2CH_2NF_2 \overset{HNF_2}{\underset{H_2SO_4}{\longleftarrow}}$$

$$NF_2CH_2\underset{\underset{\underset{O}{\downarrow}}{\overset{OP(OCH_3)_2}{|}}}{\overset{\overset{NF_2 \quad OP(OCH_3)_2}{|\quad\quad\quad|}}{C}}(CH_2)_4\underset{}{\overset{}{C}}-CH_2NF_2 \quad NF_2$$

(V)

This bis-enol phosphate (IV) was prepared as shown in the equation. It was characterized by its infrared spectrum. Its $N_2F_4$ adduct was prepared in the usual way and characterized by infrared and n.m.r. spectra.

To 1.35 g. (0.0025 mole) of (II) in 10 ml. of 100% $H_2SO_4$ was added 450 cc. (STP) of $HNF_2$. This mixture was stirred at room temperature for an hour. It was then poured into water and extracted with methylene chloride. The desired hexakis(difluoramino) octane was obtained by evaporation.

*Analysis.*—Calc'd for $C_8H_{14}N_6F_{12}$: C, 22.75; H, 3.34; N, 19.91; F, 54.00. Found: C, 22.91; H, 3.70; N, 20.06; F, 54.10.

I claim:

1. A method for the preparation of poly(difluoramino) compounds which comprises reacting a member from the class consisting of $$RCO\overset{R^2}{\underset{}{C}}HX$$

and $$(XCH_2CO)_2(CH_2)_y$$

with a compound having the formula $$P(OR^1)_3$$

followed by reaction with tetrafluorohydrazine, and finally with difluoramine in the presence of sulfuric acid in which R is selected from the group consisting of hydrogen and alkyl of 1 to 4 carbon atoms, $R^1$ is alkyl of 1 to 4 carbon atoms, $R^2$ is selected from the group consisting of hydrogen and methyl, X is selected from the group consisting of chlorine and bromine, and Y is an integer of 1 to 10.

2. A method according to claim 1 wherein the reaction with tetrafluorohydrazine is conducted at a temperature of about 80° to about 150° C. at a pressure of about 1 atmosphere to about 25 atmospheres, in which the reaction with difluoramine is conducted at a temperature of about 0° to 25° C. at atmospheric pressure.

3. A composition of matter selected from the group consisting of those compounds having the formula $$\begin{array}{cc} NF_2 & R^2 \\ R\overset{|}{\underset{|}{C}}\text{---}\overset{|}{\underset{|}{C}}H \\ NF_2 & NF_2 \end{array}$$

in which R is selected from the group consisting of hydrogen and alkyl of 1 to 4 carbon atoms, and $R^2$ is selected from the group consisting of hydrogen and methyl, and $$NF_2\text{---}CH_2\overset{NF_2}{\underset{NF_2}{\overset{|}{\underset{|}{C}}}}\text{---}(CH_2)_y\text{---}\overset{NF_2}{\underset{NF_2}{\overset{|}{\underset{|}{C}}}}\text{---}CH_2NF_2$$

in which y is an integer of 1 to 10.

4. 1,2,2-tris(difluoramino) propane.
5. 1,2,2,7,7,8-hexakis(difluoramino) octane.

References Cited

UNITED STATES PATENTS

| | | | |
|---|---|---|---|
| 3,149,165 | 9/1964 | Sausen | 260—583 |
| 3,342,866 | 9/1967 | Passannante et al. | 260—583 |
| 3,345,414 | 10/1967 | Rhodes | 260—583 |
| 3,347,923 | 10/1967 | Freedman et al. | 260—583 |

LELAND A. SEBASTIAN, *Primary Examiner.*

U.S. Cl. X.R.

149—109